United States Patent
Sun et al.

(10) Patent No.: US 9,407,180 B2
(45) Date of Patent: Aug. 2, 2016

(54) POWER CONVERTING CIRCUIT

(71) Applicant: Johnson Electric S.A., Murten (CH)

(72) Inventors: Chi Ping Sun, Hong Kong (CN); Fei Xin, Shenzhen (CN); Xiu Wen Yang, Shenzhen (CN); Shing Hin Yeung, Hong Kong (CN); Yun Long Jiang, Shenzhen (CN); Yan Yun Cui, Shenzhen (CN)

(73) Assignee: JOHNSON ELECTRIC S.A., Murten (CH)

( * ) Notice: Subject to any disclaimer, the term of this patent is extended or adjusted under 35 U.S.C. 154(b) by 0 days.

(21) Appl. No.: 14/555,924

(22) Filed: Nov. 28, 2014

(65) Prior Publication Data

US 2015/0145452 A1   May 28, 2015

(30) Foreign Application Priority Data

Nov. 28, 2013   (CN) .......................... 2013 1 0625815

(51) Int. Cl.
| | |
|---|---|
| *H02P 27/04* | (2016.01) |
| *H02P 6/14* | (2016.01) |
| *H02M 7/217* | (2006.01) |
| *H02M 7/219* | (2006.01) |
| *H02M 1/42* | (2007.01) |
| *H02M 5/44* | (2006.01) |
| *H02P 27/06* | (2006.01) |

(52) U.S. Cl.
CPC ............... *H02P 6/14* (2013.01); *H02M 1/4225* (2013.01); *H02M 5/44* (2013.01); *H02M 7/217* (2013.01); *H02M 7/219* (2013.01); *H02P 27/06* (2013.01); *Y02B 70/126* (2013.01)

(58) Field of Classification Search
CPC ........... H05B 6/12; H05B 41/16; H02P 27/04
USPC .......... 318/400.01, 400.14, 400.15, 700, 701, 318/721, 722, 800, 801, 705, 779, 799, 727, 318/729, 778, 803, 805, 811, 812, 825, 430, 318/432, 400.26, 400.27, 400.28, 400.29, 318/474, 475, 476; 363/13, 17, 21.08, 363/21.14, 21.18, 27, 34, 40, 44, 56.02, 58, 363/71, 81, 82, 84, 95, 98, 108, 109, 114, 363/120, 152, 174, 175
See application file for complete search history.

(56) References Cited

U.S. PATENT DOCUMENTS

| | | | | |
|---|---|---|---|---|
| 4,864,483 | A * | 9/1989 | Divan ................. | H02M 5/4585 363/132 |
| 5,968,398 | A * | 10/1999 | Schmitt .................. | H05B 6/062 219/620 |
| 8,295,069 | B2 * | 10/2012 | Alexander .......... | H02M 5/4585 363/132 |
| 8,351,224 | B2 * | 1/2013 | Ohashi .................. | H02M 5/271 363/34 |

FOREIGN PATENT DOCUMENTS

JP   2001086784   3/2001

* cited by examiner

*Primary Examiner* — Antony M Paul
(74) *Attorney, Agent, or Firm* — Muncy, Geissler, Olds & Lowe, P.C.

(57) ABSTRACT

A power converting circuit for supplying power to an inductive load, includes an inductance, a switching circuit and an energy saving circuit. The inductance is charged when the switching circuit is conductive and discharges energy to the energy saving circuit and the inductive load when the switching circuit is nonconductive. The energy saving circuit discharges energy to the inductive load when the switching circuit is conductive.

14 Claims, 3 Drawing Sheets

POWER CONVERTING CIRCUIT

CROSS REFERENCE TO RELATED APPLICATIONS

This non-provisional patent application claims priority under 35 U.S.C. §119(a) from Patent Application No. 201310625815.4 filed in The People's Republic of China on 28 Nov., 2013, the entire contents of which are hereby incorporated by reference.

FIELD OF THE INVENTION

This invention relates to a power converting circuit for an inductive load and in particular, to a power converting circuit especially suitable for a BLDC motor.

BACKGROUND OF THE INVENTION

A brushless direct current (BLDC) motor has a magnet rotor and a stator with at least one winding wound thereon. Power can be supplied to the motor by an AC power supply via a power converting circuit. FIG. 1 illustrates signals of voltage, current and power of an AC power supply, based on a traditional power converting circuit. At the instant the motor is connected with the AC power supply, current passes through the winding of the stator of the BLDC motor and energy is stored in the magnetic field generated by the winding. As the winding is an inductive element, the phase of the current signal is lagging compared to the phase of the voltage signal. At the instant the motor is connected with the power supply, the rotor of the motor is stationary and no back electromotive force (EMF) is generated by the winding. With an increase in the voltage, the electrified winding increases the strength of a generated magnetic field which interacts with the magnetic field of the rotor to drive the rotor and the winding therefore generates a back EMF VB. According to the traditional power converting circuit, the winding is charged during the entire period of time the AC voltage is greater than the back EMF VB and the energy stored by the winding is relative high. After the AC voltage decreases to a value smaller than the back EMF VB, the power supplied from the AC power is stopped and the winding starts to discharge energy, which generally lasts until a moment after the AC voltage passes zero, as shown by the shadowed part in FIG. 1, and negative power is therefore generated. The negative power causes part of the power to flow back to the power network and consumes electrical energy, thereby resulting in a decrease in the effective power of the AC power supply.

SUMMARY OF THE INVENTION

Hence there is a desire for a power converting circuit which reduces the negative power.

Accordingly, in one aspect thereof, the present invention provides a power converting circuit for supplying power to an inductance load, comprising: a converter for converting an AC voltage to a DC voltage, comprising first and second input terminals adapted to connect to an AC power supply and first and second DC terminals for outputting a DC voltage; a first inductance comprising first and second connecting terminals, the first connecting terminal being connected to the first DC terminal; a switching circuit comprising first and second controlled terminals and a control terminal for controlling a connection between the first and second controlled terminals; a control circuit supplying a control signal the control terminal to control the connection between the first controlled terminal and the second controlled terminal; and an energy saving circuit connected to the second connecting terminal and the second DC terminal and comprising first and second output terminals for supplying power to the inductive load; wherein the first inductance is adapted to store energy when the first and second controlled terminals are connected to each other and to discharge energy to the energy saving circuit and the inductive load when the first and second controlled terminals are disconnected from each other, and the energy saving circuit is adapted to discharge energy to the inductive load when the first and second controlled terminals are connected to each other.

Preferably, the control circuit comprises a PWM signal generator.

Preferably, a filtering circuit is connected between the first and second DC terminals.

Preferably, the filtering circuit comprises a first capacitor connected between the first and second DC terminals.

Preferably, the energy saving circuit comprises a second capacitor connected between the first and second output terminals.

Preferably, the energy saving circuit further comprises a diode, one of the first and second output terminals being connected to one of the second connecting terminal and the second DC terminal via the diode, and the other one of the first and second output terminals being directly connected to the other one of the second connecting terminal and the second DC terminal.

Preferably, the energy saving circuit further comprises a third capacitor connected between the second connecting terminal and the first output terminal and a second inductance connected between the second DC terminal and one end of the third capacitor adjacent the first output terminal.

Preferably, the energy saving circuit further comprises a diode, one of the first and second output terminals being connected to one of the second DC terminal and one end of the third capacitor adjacent the first output terminal via the diode, the other one of the first and second output terminals being connected to the other one of the second DC terminal and one end of the third capacitor adjacent the first output terminal.

According to a second aspect, the present invention provides a power converting circuit for supplying power to an inductive load, comprising an inductance, a switching circuit and an energy saving circuit. The inductance is charged when the switching circuit is conductive and discharges energy to the energy saving circuit and the inductive load when the switching circuit is nonconductive, and the energy saving circuit discharges energy to the inductive load when the switching circuit is conductive.

Preferably, the switching circuit is in parallel connected with the energy saving circuit.

Preferably, the inductive load includes an electric motor.

Preferably, the inductive load includes a BLDC motor and the power converting circuit further comprises an inverter connected between the energy saving circuit and the BLDC motor.

Preferably, the inverter is a H-bridge drive circuit.

Preferably, the inductance is connected between a DC voltage and the switching circuit.

Preferably, the energy saving circuit is connected between the switching circuit and the inductive load.

BRIEF DESCRIPTION OF THE DRAWINGS

Preferred embodiments of the invention will now be described, by way of example only, with reference to figures of the accompanying drawings. In the figures, identical structures, elements or parts that appear in more than one figure are generally labeled with a same reference numeral in all the figures in which they appear. Dimensions of components and features shown in the figures are generally chosen for convenience and clarity of presentation and are not necessarily shown to scale. The figures are listed below.

DETAILED DESCRIPTION OF THE PREFERRED EMBODIMENTS

Figure 1:
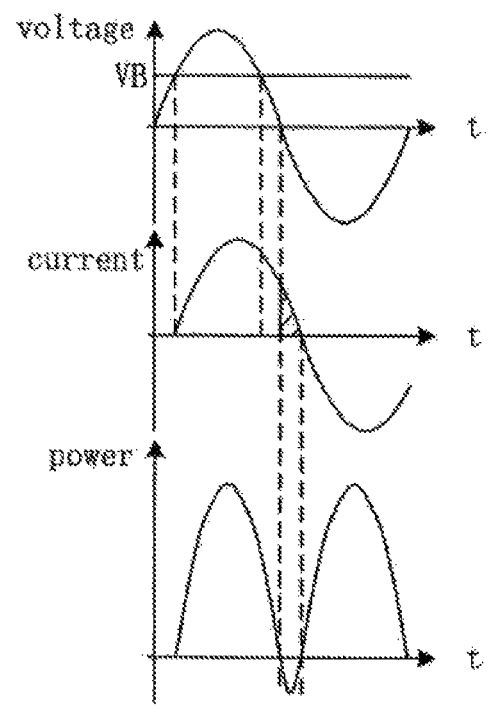
FIG. 1 illustrates signals for voltage, current and power of an AC power supply, based on a traditional power converting circuit.
Figure 2:
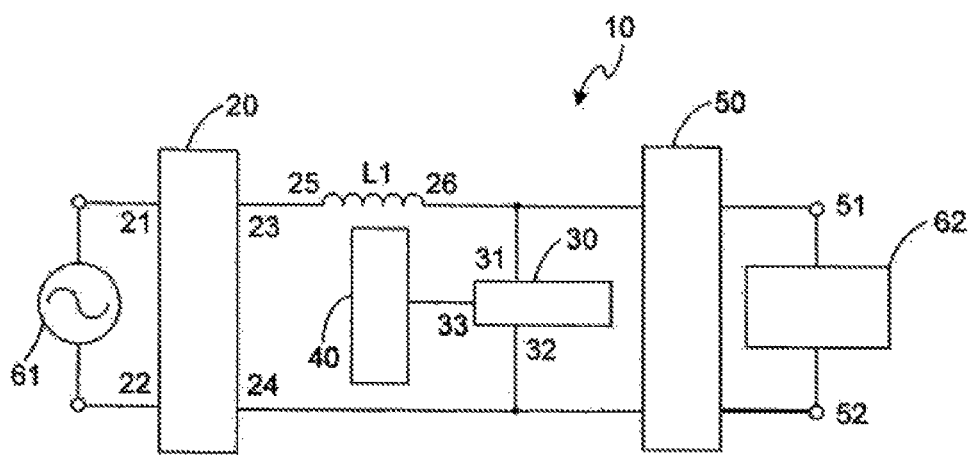
FIG. 2 illustrates a power converting circuit in accordance with an embodiment of the present invention.

FIG. 2 illustrates a power converting circuit 10 in accordance with an embodiment of the present application. The power converting circuit 10 is adapted to supply a power to an inductive load 62. In this embodiment, the inductive load 62 is preferably a BLDC motor which is driven by an inverter, which is preferably a H-bridge driving circuit. The power converting circuit 10 comprises an AC to DC converter 20, a first inductance L1, a switching circuit 30, a control circuit 40 and an energy saving circuit 50.

The AC to DC converter 20 is adapted to convert an AC voltage from an AC power supply 61 to a DC voltage and comprises a first input terminal 21, a second input terminal 22, a first DC terminal 23 and a second DC terminal 24. The first and second input terminals 21 and 22 are adapted to connect to the AC power supply 61. The first and second DC terminals 23 and 24 are adapted to output the DC voltage.

The switching circuit 30 is arranged to apply a controlled short circuit between the inductance L1 and the second DC terminal 24 in order to charge the inductance L1. The switching circuit 30 comprises a first controlled terminal 31, a second controlled terminal 32, and a control terminal 33 which controls the connection or disconnection between the first and second controlled terminals 31 and 32. The control circuit 40 provides a control signal to the control terminal 33 for selectively connecting and disconnecting the first and second controlled terminals 31 and 32. The first inductance L1 has a first connecting terminal 25 and a second connecting terminal 26 which are respectively connected to the AC to DC converter 20 and the switching circuit 30. In this embodiment, the first connecting terminal 25 is connected to the first DC terminal 23 of the AC to DC converter 20, the second connecting terminal 26 is directly connected to the first controlled terminal 31 of the switching circuit 30, and the second controlled terminal 32 of the switching circuit 30 is directly connected to the second DC terminal 24 of the AC to DC converter 20.

The energy saving circuit 50 is connected to the second connecting terminal 26 and the second DC terminal 24 and comprises a first output terminal 51 and a second output terminal 52 which are connected to the inductive load 62. The inductance L1 stores energy when the first and second controlled terminals 31 and 32 are connected and discharges energy to the inductive load 62 and the energy saving circuit 50 when the first and second controlled terminals 31 and 32 are disconnected. The energy saving circuit 50 is adapted to discharge energy to the inductive load 62 when the first and second controlled terminals 31 and 32 are connected so as to maintain the operation of the inductive load 62.

Figure 3:
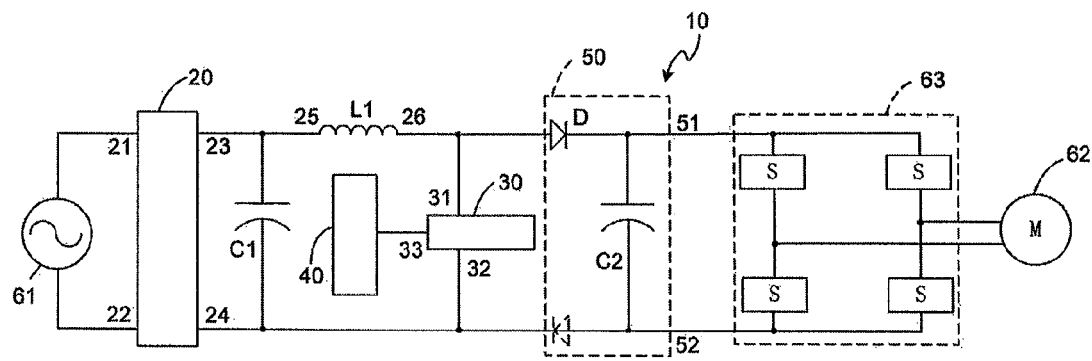
FIG. 3 illustrates a power converting circuit in accordance with another embodiment of the present invention.

FIG. 3 illustrates another embodiment of the present invention. In this embodiment, the AC to DC converter 20 is preferably a half-bridge diode rectifier. The switching circuit 30 preferably includes a bipolar junction transistor (BJT) or a metal-oxide-semiconductor field effect transistor (MOSFET). The collector and the emitter of the BJT or the drain and the source of the MOSFET are the first and second controlled terminals 31 and 32 and the base of the BJT or the gate of the MOSFET is the control terminal 33. The first controlled terminal 31 is connected to the first DC terminal 23 via the first inductance L1. The second controlled terminal 32 is connected to the second DC terminal 24. The control circuit 40 preferably includes a PWM signal generator or another type of signal generator such as single chip microcomputer.

The energy saving circuit 50 comprises a second capacitor C2 and a diode D. The second capacitor C2 is connected between the first and second output terminals 51 and 52. The anode of the diode D is connected to the second connecting terminal 26 and the cathode of the diode D is connected to the first output terminal 51. The second output terminal 52 is connected to the second DC terminal 24. Alternatively, the diode D is connected between the second DC terminal 24 and the second output terminal 51 with the anode of the diode D connected to the second output terminal 52 and the cathode of the diode D connected to the second DC terminal 24, shown in dashed lines in FIG. 3, and the first output terminal 51 is connected to the second connecting terminal 26. In other words, one of the first and second output terminals 51 and 52 is connected to one of the second connecting terminal 26 and the second DC terminal 24 via the diode D while the other one of the first and second output terminals 51 and 52 is directly connected to the other one of the second connecting terminal 26 and the second DC terminal 24.

The H-bridge driving circuit 63 comprises four switches S which can be controlled by a controller to operate the motor normally. The controller is preferably incorporated into the control circuit 40.

Figure 4:
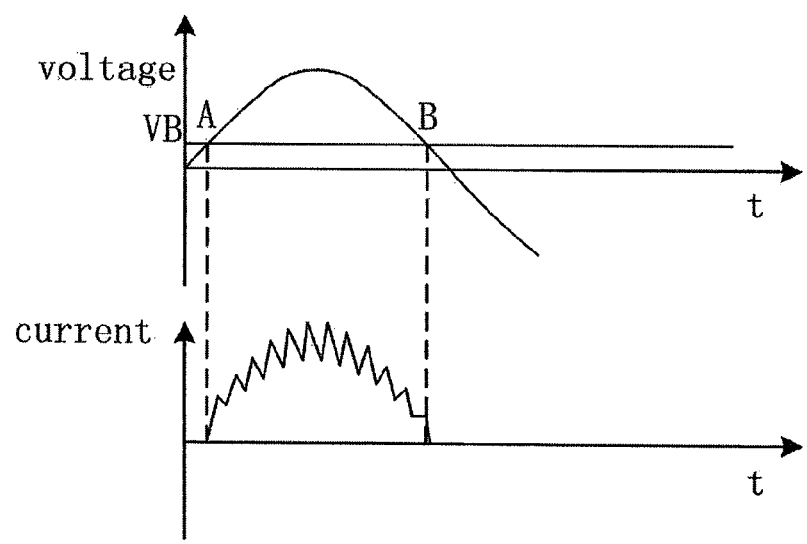
FIG. 4 illustrates signals of voltage and current of an AC power supply based on the power converting circuit of FIG. 3.

Referring to FIG. 4, during operation, the converting circuit 20 coverts the AC voltage to a DC voltage output by the first and second DC terminals 23 and 24. The DC voltage is supplied to the H-bridge driving circuit 63 via the first inductance L1 and the energy saving circuit 50 to drive the BLDC motor 62. When the BLDC motor rotates, back EMF VB is generated by the winding of the motor. After the AC voltage gradually increases to a value greater than the back EMF VB (at point A in the Figure) the current is provided by the AC power supply 61. Before point A no current passes from the AC power supply 61.

The AC power supply 61 supplies power between point A and point B as the voltage of the AC power supply 61 is greater than the back EMF VB. The switching circuit 30 is conductive or nonconductive under the control of the control circuit 40. When the switching circuit 30 is conductive, the AC power supply 61 forms a circuit with the AC to DC converter 20, the first inductance L1 and the switching circuit 30 to charge the first inductance L1. During this period the first inductance L1 has the same polarity as the DC voltage output by the AC to DC converter 20. When the switching circuit 30 is nonconductive, the voltage on the first inductance L1 is superimposed on the DC voltage. A first circuit is formed by the AC power supply 61, the AC to DC converter 20, the first inductance L1, and the diode D and the second capacitor C2 of the energy saving circuit 50 to charge the second capacitor C2. Meantime, a second circuit is formed by the AC power supply, the AC to DC converter 20, the first inductance L1, the diode D, the H-bridge driving circuit 63 and the motor 62 so as to drive the motor. When the switching circuit 30 is conductive again, the first inductance L1 is charged again and the second capacitor C2 discharges energy to the motor 62 via the H-bridge driving circuit 63 to maintain the operation of the motor. When the switching circuit 30 is nonconductive, the second capacitor C2 is charged again.

When the AC voltage decreases to a value equal to the back EMF VB (at point B in the Figure), even decrease to zero, if there is energy stored in the winding of the motor, that is, voltage exists at the inductive load 62, energy saved in the motor flows back to the AC power supply 61 via the H-bridge driving circuit 63 when the switching circuit 30 is nonconductive. The discharging period corresponds to the switching frequency and the conduction time of the switching circuit 30 which corresponds to the duty cycle of the control signal of the control circuit 40.

As the switching circuit 30 is alternately conductive and nonconductive, the period of time charging the energy saving circuit 50 and the inductive load 62 can be controlled very short and the energy stored in the inductive load 62 can be therefore reduced and the discharge can be finished quickly. Thus, the negative power is reduced, which improves the effective output of the BLDC motor and decreases the consumption of the power network, and the electrical efficiency is therefore increased.

Moreover, as the voltage on the first inductance L1 is superimposed on the DC voltage output by the AC to DC converter 20 during the discharge of the first inductance L1, the voltage applied to the motor is higher than the voltage of the AC power supply 61, which can be used to drive a motor requiring a higher voltage.

Preferably, a filtering circuit is connected between the first and second DC terminals 23 and 24 for filtering the DC voltage output from the first and second DC terminals 23 and 24. In this embodiment, the filtering circuit includes a first capacitor C1. It should be understood that the filtering circuit could alternatively include a LC circuit where the inductance in the LC circuit is connected between the AC to DC converter 20 and the first capacitor C1, or could include only an inductance.

During the period of time between point A and point B, the rotating speed of the motor can be controlled by adjusting the conduction time of the switching circuit 30 which corresponds to the duty cycle of the control signal of the control circuit 40. The higher the duty cycle, which means the switching circuit has longer conduction time, the less energy is saved in the winding of the motor and discharged after point B, and thus the negative power can be reduced.

Figure 5:
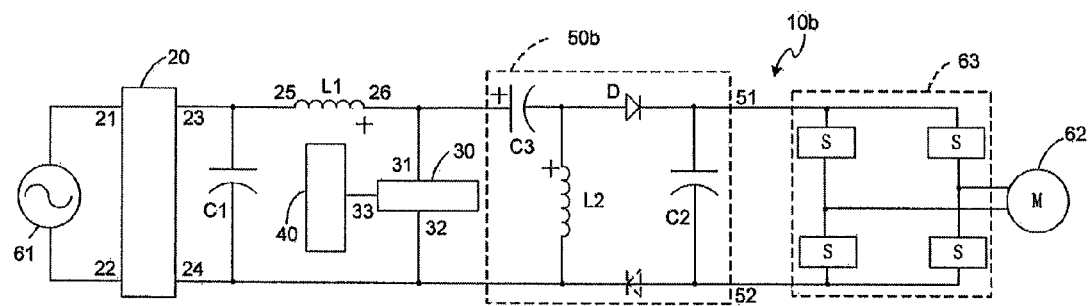
FIG. 5 illustrates a power converting circuit in accordance with another embodiment of the present invention.

FIG. 5 illustrates the power converting circuit 10b in accordance with another embodiment of the present invention. The power converting circuit 10b is similar to the power converting circuit 10. The differences between them is that the energy saving circuit 50b of the power converting circuit 10b further comprises a third capacitor C3 and a second inductance L2 besides the diode D and the second capacitor C2. The third capacitor C3 is connected between the second connecting terminal 26 and the anode of the diode D. The second inductance L2 is connected between the second DC terminal 24 and the anode of the diode D.

Figure 6:
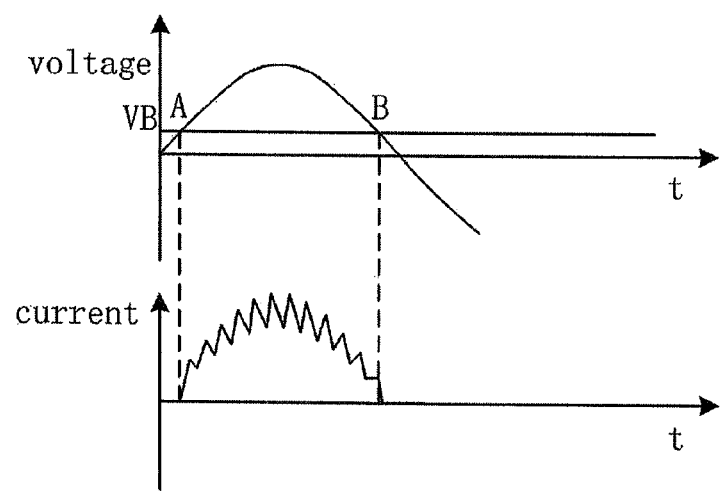
FIG. 6 illustrates signals of voltage and current of an AC power supply based on the power converting circuit of FIG. 5.

Referring to FIG. 6, during operation, a voltage is applied to the BLDC motor 62, the motor rotates and back EMF VB is generated by the winding. When the AC voltage gradually increase to a value greater than the back EMF VB (at point A in the figure), current is provided by the AC power supply 61. During the period of time between point A and point B, in which the voltage of the AC power supply 61 is greater than the back EMF VB, when the switching circuit 30 is nonconductive, a first circuit is formed by the AC power supply 61, the AC to DC converter 20, the first inductance L1, the third capacitor C3 and the second inductance L2, a second circuit is formed by the AC power supply 61, the AC to DC converter 20, the first inductance L1, the third capacitor C3, the diode D and the second capacitor C2, and a third circuit is formed by the AC power supply 61, the AC to DC converter 20, the first inductance L1, the third capacitor C3, the diode D, the H-bridge driving circuit 63 and the BLDC motor 62. During this period the second capacitor C2 and the third capacitor C3 are charged. The three circuits are disconnected after the third capacitor C3 is fully charged. When the switching circuit 30 is conductive, a circuit is formed by the AC power supply 61, the AC to DC converter 20, the first inductance L1 and the switching circuit 30 to charge the first inductance L1 while the third capacitor C3 is discharged to the second inductance L2 via the switching circuit 30 so that energy is saved in the second inductance L2. Meantime the second capacitor C2 supplies power to the BLDC motor. When the switching circuit 30 is nonconductive the polarities of the first and second inductances L1, L2, and the third capacitor C3 are as shown in FIG. 5.

As the switching circuit 30 is alternately conductive and nonconductive, the period of time charging the energy saving circuit 50b and the winding of the motor 62 can be controlled very short and the energy stored in the inductance load can be therefore reduced and the discharge can be finished quickly. Thus, the negative power is reduced, which improves the effective output of the BLDC motor and decreases the consumption of the power network, and the electrical efficiency is therefore increased.

Moreover, in this embodiment, if the duty cycle of the control signal generated by the control circuit 40 is relative high, that is, the conduction time of the switching circuit 30 is longer than the nonconduction time of the switching circuit 30, the voltage of the third capacitor C3 decreases quickly during the conduction of the switching circuit 30, and the voltages of the first and second inductances L1 and L2 are relatively high due to the longer charging time. Therefore, during the nonconduction of the switching circuit 30 the voltage applied to the motor 62 is higher, compared to the previous embodiment, as the voltage of the third capacitor C3 is relatively small. Reversely, if the duty cycle of the control signal generated by the control circuit 40 is relative small, that is, the conduction time of the switching circuit 30 is shorter than the nonconduction time of the switching circuit 30, the rising of the voltage of the third capacitor C3 is faster than the rising of the voltages of the first inductance L1 and the second inductance L2. In other words, the voltage of the third capacitor C3 could be greater than the sum of the voltage of the first inductance L1 and the voltage of the second inductance L2. Thus, during conduction of the switching circuit 30, as the conduction time is relatively short, the decrease in the voltage of the third capacitor C3 is relatively small, which could make the voltage applied to the motor 62 even smaller than the voltage of the first capacitor C1. Therefore, the power converting circuit 10b in this embodiment is capable of generating various voltages by controlling the duty cycle of the control signal to drive different types of motors.

In the description and claims of the present application, each of the verbs "comprise", "include", "contain" and "have", and variations thereof, are used in an inclusive sense, to specify the presence of the stated item but not to exclude the presence of additional items.

It is appreciated that certain features of the invention, which are, for clarity, described in the context of separate embodiments, may also be provided in combination in a single embodiment. Conversely, various features of the invention which are, for brevity, described in the context of a single embodiment, may also be provided separately or in any suitable sub-combination.

Although the invention is described with reference to one or more preferred embodiments, it should be appreciated by those skilled in the art that various modifications are possible. Therefore, the scope of the invention is to be determined by reference to the claims that follow.

The invention claimed is:

1. A power converting circuit for supplying power to an inductance load, comprising:
    a converter for converting an AC voltage to a DC voltage, comprising first and second input terminals adapted to connect to an AC power supply and first and second DC terminals for outputting a DC voltage;
    a first inductance comprising first and second connecting terminals, the first connecting terminal being connected to the first DC terminal;
    a switching circuit comprising first and second controlled terminals and a control terminal for controlling a connection between the first and second controlled terminals;
    a control circuit supplying a control signal the control terminal to control the connection between the first controlled terminal and the second controlled terminal; and
    an energy saving circuit connected to the second connecting terminal and the second DC terminal and comprising first and second output terminals for supplying power to the inductive load;
    wherein the first inductance is adapted to store energy when the first and second controlled terminals are connected to each other and to discharge energy to the energy saving circuit and the inductive load when the first and second controlled terminals are disconnected from each other, and the energy saving circuit is adapted to discharge energy to the inductive load when the first and second controlled terminals are connected to each other.

2. The power converting circuit of claim 1, wherein the control circuit comprises a PWM signal generator.

3. The power converting circuit of claim 1, further comprises a filtering circuit connected between the first and second DC terminals.

4. The power converting circuit of claim 3, wherein the filtering circuit comprises a first capacitor connected between the first and second DC terminals.

5. The power converting circuit of claim 4, wherein the energy saving circuit comprises a second capacitor connected between the first and second output terminals.

6. The power converting circuit of claim 5, wherein the energy saving circuit further comprises a diode, one of the first and second output terminals being connected to one of the second connecting terminal and the second DC terminal via the diode, and the other one of the first and second output terminals being directly connected to the other one of the second connecting terminal and the second DC terminal.

7. The power converting circuit of claim 5, wherein the energy saving circuit further comprises a third capacitor connected between the second connecting terminal and the first output terminal and a second inductance connected between the second DC terminal and one end of the third capacitor adjacent the first output terminal.

8. The power converting circuit of claim 7, wherein the energy saving circuit further comprises a diode, one of the first and second output terminals being connected to one of the second DC terminal and one end of the third capacitor adjacent the first output terminal via the diode, the other one of the first and second output terminals being connected to the other one of the second DC terminal and one end of the third capacitor adjacent the first output terminal.

9. A power converting circuit for supplying power to an inductive load, comprising an inductance, a switching circuit and an energy saving circuit;
    wherein the inductance is connected between a DC voltage and the switching circuit;
    wherein the inductance is charged when the switching circuit is conductive and discharges energy to the energy saving circuit and the inductive load when the switching circuit is nonconductive, and the energy saving circuit discharges energy to the inductive load when the switching circuit is conductive.

10. The power converting circuit of claim 9, wherein the switching circuit is connected in parallel with the energy saving circuit.

11. The power converting circuit of claim 9, wherein the inductive load includes an electric motor.

12. The power converting circuit of claim 9, wherein the inductive load includes a BLDC motor and the power converting circuit further comprises an inverter connected between the energy saving circuit and the BLDC motor.

13. The power converting circuit of claim 12, wherein the inverter is a H-bridge drive circuit.

14. The power converting circuit of claim 9, wherein the energy saving circuit is connected between the switching circuit and the inductive load.

* * * * *